No. 777,464. PATENTED DEC. 13, 1904.
C. C. WORTHINGTON.
VEHICLE WHEEL TIRE.
APPLICATION FILED MAY 12, 1904.
NO MODEL. 2 SHEETS—SHEET 2.

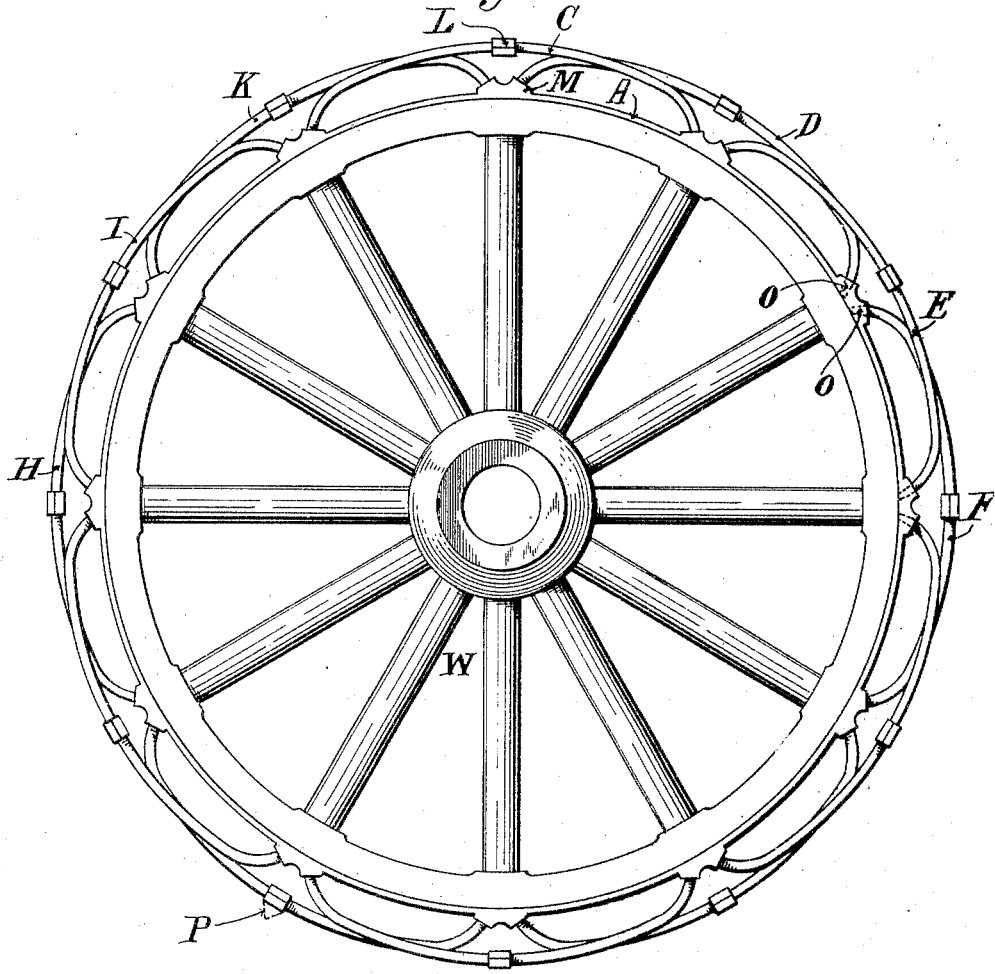

No. 777,464.

Patented December 13, 1904.

UNITED STATES PATENT OFFICE.

CHARLES C. WORTHINGTON, OF DUNNFIELD, NEW JERSEY.

VEHICLE-WHEEL TIRE.

SPECIFICATION forming part of Letters Patent No. 777,464, dated December 13, 1904.

Application filed May 12, 1904. Serial No. 207,515. (No model.)

*To all whom it may concern:*

Be it known that I, CHARLES C. WORTHINGTON, a citizen of the United States, residing at Dunnfield, Warren county, New Jersey, have invented certain new and useful Improvements in Vehicle-Wheel Tires, of which the following is a full, true, and concise specification.

The present invention relates to new and useful improvements in resilient tires for vehicle-wheels; and it consists, briefly, in a simple arrangement of parts for utilizing the resiliency of a plurality of arched spring-rods, with their mid-portions or the portions which constitute the crowns of the arches so disposed as to form a substantially circular wheel-tread; and the object of the invention is the production of a comparatively cheap and durable metallic tire which will afford a satisfactory and superior substitute for rubber and pneumatic tires, a further object being a construction of tires of the kind mentioned of greater efficiency than others that have to my knowledge been heretofore produced, both in respect of operation and of facility for removal and repair.

Figure 3:
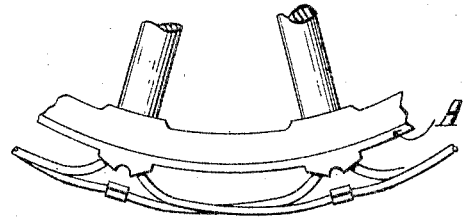
Figure 4:
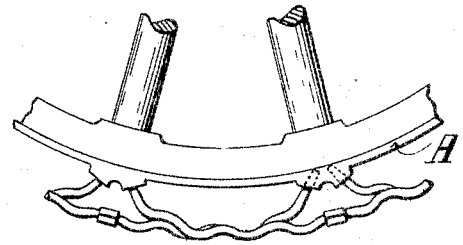
Figure 5:
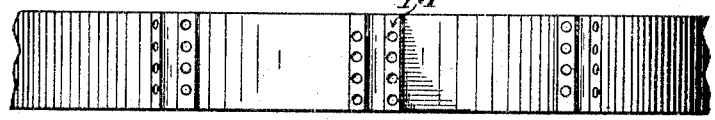
Figure 6:
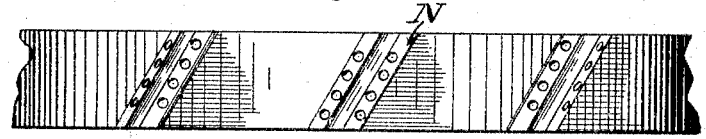

In the drawings forming a part of this specification, Figure 1 is a side elevation of an ordinary form of wheel with its felly surrounded by a tire embodying this invention. Fig. 2 is a top plan view of Fig. 1. Fig. 3 is a modification of the spring members or rods. Fig. 4 is a further modification. Fig. 5 is a sectional detail of an under tire in plan, and Fig. 6 is a modified form of the under tire shown in Fig. 5.

The reference-letter W represents a wheel or rotatable inner part of circular outline, to which are connected the resilient members of the outer part or tire. In the drawings the wheel is shown as provided with a felly and spokes; but obviously a circular disk or a solid wheel may take the place of the wheel shown without materially affecting the operation of the outer resilient members, which, as will presently appear, require only to be suitably supported around the axis of rotation.

The tire proper is composed of a plurality of spring-rods running substantially parallel with the plane of the wheel and bowed or curved into the shape of arches which open inwardly or toward the hub. The end portions of the rods or the portions which constitute the ends of the arches are seated upon a circular band or under tire A, and their mid-portions or the portions which constitute the crowns of the arches are preferably concentric to the hub, or nearly so, and form the wheel-tread, which is designed to come directly into actual contact with the ground and does not require the interposition of an additional tire or tread-surface. In the preferred form the rods are arranged side by side in united sections C D E, &c., around the periphery of the inner part or wheel, as shown in Figs. 1 and 2, there being four rods C' C', D' D', E' E', &c., to each section and each of said rods being bowed or curved, as above described, to form an arch. The several sections interlap more or less with one another, so that their mid-portions form a substantially continuously circular wheel-tread, the members of each section being properly spaced and united by the clamp or bond L, although the sections may be formed integrally, if desired, or of separate and independent rods with substantially equal effect. Conveniently each section interlaps about half-way into each of its adjacent sections in a circumferential direction; but it is to be understood that the extent of such interlapping as well as the dimensions of the several rods and the number of rods to a section are matters of degree which depend upon the size of the wheel and the work to be performed by it and are necessarily, therefore, left to the judgment of the manufacturer, to be varied according to the particular requirements of the case in hand.

The clamp L above mentioned consists, as shown, of two complementary plates recessed to receive the rods and firmly united by rivets or screws. They may obviously be formed in other ways to accomplish the same result and, moreover, may be provided with creepers or projections for preventing slipping upon ice or slippery pavements, as shown by dotted lines at P, Fig. 1.

The degree of curvature of the rods is not of special importance; but it is preferred that they approach a circle for the major portions of their lengths with their end portions turned gradually inward, about as shown in Fig. 1 of the drawings, so as to coincide more or less with the general direction of the thrust when a bending or compressing force is applied to them, such as would occur from the weight of a superposed load or the encountering of obstacles on the surface of the ground. While each of the rods is shown as forming but a single arch, it will nevertheless be manifest that one or more arches may be formed of a continuous rod, if desired, the disposition of them in sections of single arches each being preferred principally on account of the simplicity in construction and manufacture and the facility of their insertion and removal.

The seats for the ends of the rods or arches by means of which they are secured to the inner part are shown in the drawings as located upon the circular band or under tire A; but it will be observed that this latter member is not essential with certain types of wheels and may be omitted when the nature of the inner part is such that the rods may be properly supported directly upon it. In this case the circumferential boundary of the inner part would become the under tire. In the wheel shown, however, which is of the type usually wooden with a wooden felly, the under tire, as shown, is desirable; but as it is never in working contact with the ground it is required to be only of sufficient strength or cross-sectional area to stand the bursting strain of the wheel and such additional strain as may be exerted by the spring-rods. It may therefore be made comparatively thin throughout the major part of its circumference and correspondingly light in weight, being reinforced at intervals where the strains of the rods are exerted upon it by the transverse ribs or thickened portions designated M. These ribs are bored or socketed, as at O, to receive the ends of the members of each section and are spaced apart by distances somewhat shorter than the linear dimensions of the respective rod-sections and, in fact, slightly shorter than the normal distance between the opposite ends of said sections, so that when the latter are inserted in the sockets they will normally be under tension, which serves to keep them securely but removably fastened to the under tire or inner part without additional fastening means. The sockets or apertures O are preferably inclined, as shown, in a direction to coincide with the ends of the rods and substantially with the directions of the thrusts thereof, the sockets and rods being correspondingly tapered to insure close fitting between the two, this being also a convenient manner to form the sockets, so that they will prevent the rods from protruding through the band and piercing the felly, and, moreover, the slight taper aids materially in inserting the rods.

It will be observed that the strains exerted upon the resilient members during the operation of the wheel are all in a direction which tends to seat the same more firmly in their respective sockets and also that such strains are divided and shared by more than one rod or arch, according to the extent of their interlapping and the number of the same disposed side by side. The several rods or rod-sections may be readily connected and disconnected from the inner part in the form of attachment shown by simply springing them into or out of their sockets, and in case of accident or damage to a single rod the same may be removed without materially impairing the efficiency of the wheel.

In Fig. 3 is shown a section of a tire in which the central or crown portions of the arches are slightly depressed or reëntrant toward the hub of the wheel, so that the clamps L, which are located upon these portions, may be relieved of excessive wear and the wheel-tread will be more accurately circular, and in Fig. 4 the rods are shown crinkled with a view to diminishing the liability to skid, as well as to increase the resiliency of the tire without resorting to smaller diameters of rods.

The detail shown in Fig. 6 represents a modification of the disposition of the sockets. The ribs N of this figure are diagonal on the face of the under tire and the laterally-adjacent rods supported in them, whether they be united into sections or not, present the crowns of their arches in different radial positions around the wheel, thereby producing a still more continuously circular wheel-tread.

The invention is manifestly capable of embodiment in various other modifications of construction and disposition of the parts. The spring-rods are not required to be parallel either with each other or with the wheel-tread, and neither is it essential that the resilient members interlap, inasmuch as an appropriate reduction in the size of each section and a multiplication of the number disposed around the inner part could obviously result in substantially the same degree of resiliency and at the same time form a wheel-tread sufficiently continuous in circular outline to be of practical service. Moreover, it will be understood that the cross-sectional contour of the rods may be circular or angular, as may be desired, according to the judgment or fancy of the manufacturer, these and all other obvious modifications of the invention being intended to be included within the scope and spirit of this specification.

Having described my invention, what I claim, and desire to secure by United States Letters Patent, is—

1. In a vehicle-wheel, an inner part, in combination with a surrounding resilient outer part composed of a plurality of spring-rods bowed into the shape of arches running substantially parallel with the plane of the wheel and seats provided on said inner part for supporting the opposite ends of said arches whereby the mid or crown portions of the latter constitute the wheel-tread.

2. In a vehicle-wheel, an inner part, in combination with a surrounding resilient outer part composed of a plurality of spring-rods disposed side by side and bowed into the shape of arches which interlap with one another and seats provided on the said inner part supporting the opposite ends of said interlapping arches whereby the mid or crown portions of the latter constitute a substantially continuously circular wheel-tread.

3. In a vehicle-wheel, an inner part, in combination with a surrounding outer part composed of a plurality of substantially parallel spring-rods arranged in interlapping sections, the several members whereof are united and bowed into the shape of arches, and seats provided on the said inner part supporting the opposite ends of said interlapping sections or arches, whereby the mid or crown portions of the latter constitute a substantially continuously circular wheel-tread.

4. A vehicle-wheel tire comprising a circular under tire and a plurality of substantially parallel spring-rods surrounding and attached at their opposite ends to said under tire with their mid-portions bowed outwardly to form a resilient and substantially circular wheel-tread.

5. A vehicle-wheel tire comprising an under tire, a plurality of spring-rods surrounding the same to form a resilient wheel-tread and attached at their opposite ends to points thereon which are separated by shorter distances than the lengths of said rods, whereby the latter are bowed outwardly and are normally under tension.

6. A vehicle-wheel tire comprising an under tire, a plurality of curved spring-rods extending around the same in substantially the plane of its rotation to form a resilient wheel-tread, and adapted for connection by their ends with said under tire, in combination with a plurality of sockets in said under tire adapted to receive the ends of said rods and separated by distances which are shorter than the normal distance between the ends of the rods which they are adapted to hold, whereby said rods may be sprung into place upon the under tire and normally held thereon by their own elasticity.

7. A vehicle-wheel tire comprising an under tire and a plurality of spring-rods extending around the same and attached by their opposite ends to said under tire with their intermediate portions bowed outwardly, in combination with sockets in said under tire inclined to coincide substantially with the ends of said rods and adapted to receive the thrust thereof.

8. A vehicle-wheel tire comprising an under tire and a plurality of interlapping spring-rods bowed into the shape of arches running substantially parallel with said under tire, with the mid or crown portions of the same constituting a resilient wheel-tread, in combination with seats on said under tire for supporting the ends of said arches.

9. A vehicle-wheel tire comprising an under tire having transverse reinforcing-ribs and sockets in said ribs, in combination with a number of interlapping sections of bowed spring-rods disposed with their ends seated in said sockets and held therein by their normal tension.

10. A vehicle-wheel tire comprising an under tire having a plurality of inwardly-tapered apertures formed around the same, in combination with a plurality of bowed spring-rods having their opposite ends correspondingly tapered and adapted to seat in said inwardly-tapered apertures.

11. In a vehicle-wheel, an inner part, a surrounding resilient outer part composed of a plurality of sections of parallel spring-rods in arched form running substantially parallel with the plane of the wheel and means for fastening said sections to the inner part, in combination with a reëntrant curve in the mid-portions of said spring-rods and a clamp located therein and joining the rods of a section.

12. In a vehicle-wheel, an inner part, in combination with a surrounding resilient outer part composed of a plurality of crinkled spring-rods bowed into the shape of arches running substantially parallel with the plane of the wheel and seats provided on said inner part supporting the ends of said arches, whereby the mid or crown portions of the latter constitute a substantially circular wheel-tread.

In testimony whereof I have signed my name to this specification in the presence of two subscribing witnesses.

CHAS. C. WORTHINGTON.

Witnesses:
G. A. TAYLOR,
H. G. KIMBALL.